United States Patent [19]

Reimann et al.

[11] Patent Number: 4,695,960
[45] Date of Patent: Sep. 22, 1987

[54] METHOD AND APPARATUS FOR NUMERICAL CONTROL OF MACHINE TOOLS

[75] Inventors: Jürgen-Andreas Reimann, Erlangen; Herbert Basilowski, Spardorf, both of Fed. Rep. of Germany

[73] Assignee: Siemens Aktiengesellschaft, Berlin & Munich, Fed. Rep. of Germany

[21] Appl. No.: 790,845

[22] Filed: Oct. 24, 1985

[30] Foreign Application Priority Data

Nov. 26, 1984 [DE] Fed. Rep. of Germany ....... 3443016

[51] Int. Cl.$^4$ ............................ B23F 5/00; H02P 5/00
[52] U.S. Cl. ................................................. 364/474
[58] Field of Search .................. 364/474, 475; 409/15; 318/621

[56] References Cited

U.S. PATENT DOCUMENTS

| | | | |
|---|---|---|---|
| 3,987,350 | 10/1976 | Pomella et al. | 318/572 |
| 4,053,819 | 10/1977 | Matsumoto | 318/573 |
| 4,096,770 | 6/1978 | Tanner | 364/474 |
| 4,253,050 | 2/1981 | Angst | 364/474 |
| 4,329,096 | 5/1982 | Herscovici | 364/475 |

*Primary Examiner*—Jerry Smith
*Assistant Examiner*—Allen MacDonald
*Attorney, Agent, or Firm*—Kenyon & Kenyon

[57] ABSTRACT

In a hobbing machine for producing a gear from a workpiece, a device for controlling the rate of rotation of the workpiece in accordance with the motion of a cutting tool compensates for a lag in a feedback loop servo control and concomitantly in the rotation of the workpiece. The device calculates a correction quantity from the actual velocity of the tool and the loop gain of the feedback loop servo control and feeds the correction quantity thereto.

10 Claims, 2 Drawing Figures

METHOD AND APPARATUS FOR NUMERICAL CONTROL OF MACHINE TOOLS

BACKGROUND OF THE INVENTION

This invention relates to a method and apparatus for the numerical control of machining tools used in the manufacture of gears from workpieces. The invention also relates to a method for manufacturing such gears.

In machining apparatuses having numerical control devices, the motion of the workpiece is dependent on at least one kind of motion of the cutting tool. An input variable for a position control of the workpiece is derived from the actual position of the tool.

In the manufacture of gears by equipment such as hobbing machines, it is necessary that the tool and the workpiece are rotated relative to one another with a predetermined reduction ratio. Generally, the rotation of a tool (e.g., a milling cutter) is used as the control motion and the rotation of the workpiece is achieved by divider transmissions. For uniform tool wear and the production of helical gearing, the tool may be additionally moved in other directions and along other paths.

If mechanical gearing is to be avoided and electronic tracking of the workpiece relative to the tool is to be achieved, a variable proportional to the rotation of the tool is generated as the desired value in a position control loop of the workpiece. Where the tool undergoes a number of different kinds of motion, the rotation of the workpiece may be controlled in accordance with or in response to the different motions of the machine tool. Correction quantities derived from the various motions of the tool are superimposed additively.

In the electronic position control of workpiece motion, a lag occurs which is due, for example, to a difference between the desired position of the workpiece and the instantaneous actual position thereof. This lag leads to inaccuracies in the production of gearing.

An object of the present invention is to provide an improved method and apparatus for the production of gearing in a simple manner and with high accuracy.

Another, more particular, object of the present invention is to provide an improved numerical control of the above-described type.

SUMMARY OF THE INVENTION

The present invention is directed in particular to a numerical control of a machining apparatus for manufacturing a gear from a workpiece, the numerical control including a position control device for controlling a rotation of the workpiece in accordance with a motion of a tool. The numerical control device generates an electrically encoded control variable and feeds this control variable to the position control device to determine the operation thereof. In accordance with the present invention, the numerical control functions to compensate or reduce a lag in the response of the position control device and in the rotation of the workpiece with respect to changes in an actual rate of rotation of the tool. The numerical control includes a computing unit for calculating a correction quantity representative of the lag. The numerical control further includes an adder for combining the correction quantity with the control variable prior to the feeding thereof to the position control device so that the lag is reduced.

In accordance with one of two alternative features of the present invention, the computing unit calculates the correction quantity from the actual rate of rotation of the tool and a loop gain of the position control device. In accordance with the other of the two alternative features, the correction quantity is calculated from a rate of change of the control variable. The latter alternative is available if the calculation and the position control functions are implemented by a computer as is customary in conventional machine tools having numerical control.

In accordance with yet another feature of the present invention, the numerical control also functions to reduce an additional lag in the response of the position control device and in the rotation of the workpiece with respect to changes in an actual rate of translation of the tool. The numerical control includes an additional computing unit for calculating an additional correction quantity representative of the additional lag. In the case of the former of the above-described pair of alternatives, the additional correction quantity is calculated from the actual rate of translation of the tool and a loop gain of the position control means.

Advantageously, the adder combines the additional correction quantity with the control variable prior to the feeding thereof to the position control device so that the additional lag is reduced.

In accordance with the invention, a method for the manufacture of a gear from a workpiece comprises the steps of (a) rotating a machine tool about a first axis of rotation, (b) rotating the workpiece about a second axis of rotation, and (c) bringing the machine tool into contact with the workpiece to cut gear teeth into the workpiece. The method comprises the additional steps of (d) detecting an actual angular position of the tool, (e) generating an electrical signal representing a desired angular position of the tool, and (f) changing the rate of rotation of the tool so that the actual angular position corresponds to the desired angular position. Further steps include: (g) altering, by means of a feedback loop servo control, the rate of rotation of the workpiece in response to changes in the rate of rotation of the tool, and (h) calculating from the rate of rotation of the tool and a loop gain of the feedback loop servo control a correction quantity representative of a lag in the response of the feedback loop servo control and in the rotation of the workpiece with respect to changes in the rate of rotation of the tool. The correction quantity is fed to the feedback loop servo control to reduce the lag.

In accordance with another feature of the present invention, further steps include: (j) translating one of the workpiece and the tool along a path, (k) detecting the actual linear position of the workpiece or the tool along the path, (l) generating an electrical signal encoding a desired linear position of the translating component, and (m) changing the rate of translation of the translating component so that the actual linear position corresponds to the desired linear position. In another step (n) of the method in accordance with the present invention, an additional correction quantity representative of an additional lag in the response of the feedback loop servo control and the rotation of the workpiece with respect to changes in the rate of translation of the translating component is calculated. This additional correction quantity is fed to the feedback loop servo control to reduce the additional lag. The correction quantity may be calculated from the actual rate of translation of the translating component and the loop gain of the feedback loop servo control. Alternatively, the correction quantity may be calculated from the rate of change of a control variable fed to the feedback loop servo control.

DETAILED DESCRIPTION

Figure 1:
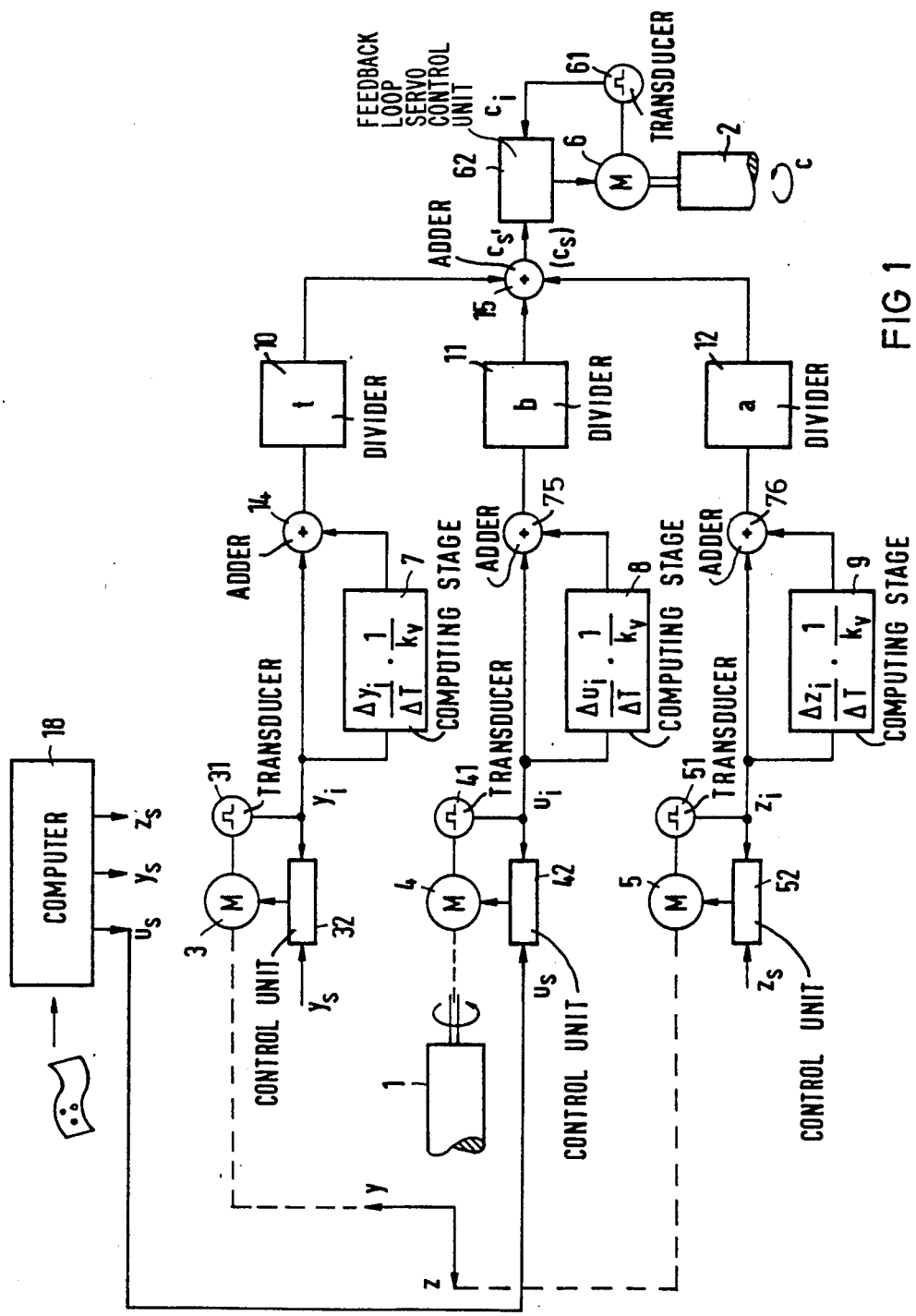
FIG. 1 a block diagram of a numerical control device, in accordance with the present invention, for controlling the rate of rotation of a workpiece in a machining apparatus for manufacturing gears.

As illustrated in FIG. 1, a machine tool apparatus includes two electric drive motors 3 and 5 for translating a tool 1 in a pair of mutually perpendicular directions, i.e., along a pair of mutually perpendicular axes y and z. The machine tool apparatus further includes a third electric motor 4 for rotating the tool 1 about an axis of rotation u which may coincide with one of the translation axes y and z. Drive motors 3, 4 and 5 have associated position or angle control loops comprising respective feedback loop servo control devices 32, 42 and 52 and respective sensors or transducers 31, 41 and 51. Sensors 31, 41 and 51 serve to detect the position of tool 1 along the y axis, the angular position of tool 1 with respect to the u axis, and the position of tool 1 along the z axis, respectively.

A computer 18 generates electrical signals respectively encoding reference or desired values $y_s$, $u_s$, and $z_s$ for the y position, the angular position and the z position of the tool, these signals being transmitted to feedback loop servo control devices 32, 42 and 52.

To produce a gear from a workpiece 2 by means of a hobbing machine, for example, the rotation of the workpiece about an axis of rotation c must be responsive to the rotation of tool 1 about axis u and also to the translation of tool 1 along axes y and z (axial and tangential motions relative to rotation axis u). To this end, electrical signals encoding the actual positions $y_i$, $u_i$ and $z_i$ of tool 1 with respect to axes y, u and z are generated by sensors or detectors 31, 41 and 51 and transmitted to an adder 15, wherein the electrically encoded actual positions $y_i$, $u_i$ and $z_i$ are algebraically combined to form an input control variable $c_s$ for a feedback loop servo control device 62. The position-encoding electrical signals are transmitted to adder 15 via dividers 10, 11 and 12 which are set in accordance with desired gear reduction coefficients t, b and a.

Feedback loop servo control device 62 is included in an angle control loop for controlling the rate of rotation and angular positioning of workpiece 2 with respect to rotation axis c. This control loop also includes a sensor or transducer for detecting the angular position of workpiece 2 with respect to axis c and transmitting the detected position $c_i$ in encoded form as an electrical signal to feedback loop servo control device 62.

In the case where the motion of tool 1 is limited to rotation about axis u, the following relation must hold true:

$$c_s = bu_i$$

or $$\dot{c}_s = b\dot{u}_i$$

where input control variable $c_s$ represents the desired angular position of workpiece 2 with respect to axis c, parameter $\dot{c}_s$ is the angular velocity of workpiece 2 and $\dot{u}_i$ represents the angular velocity of tool 1 with respect to axis u. The resulting lag error $\Delta c$ is:

$$\Delta c = \dot{c}_s/k_v$$

where $k_v$ is the gain in the angle control loop for the workpiece 2.

Upon substitution, the following equation is obtained:

$$\Delta c = b\dot{u}_i/k_v.$$

The lag $\Delta c$ of workpiece 2 which is due to the rotation of tool 1 can be calculated in accordance with this equation. Similar equations are derivable for lags corresponding to the motion of tool 1 along axes y and z. The lag errors associated with three degrees of motion of tool 1 are superimposed upon one another to produce the total lag in the motion of the workpiece.

The changes in position $\Delta y_i$, $\Delta u_i$ and $\Delta z_i$ of tool 1 from cycle to cycle of computer 18 and control devices 32, 42 and 52 are measures of velocities $\dot{y}_i$, $\dot{u}_i$ and $\dot{z}_i$ of the tool along the y axis, about the u axis and along the z axis, respectively. As illustrated in FIG. 1, a numerical control in accordance with the invention includes three arithmetic units or computing stages 7, 8 and 9 which calculate velocities $\dot{y}_i$, $\dot{u}_i$ and $\dot{z}_i$ as quotients $\Delta y_i/\Delta T$, $\Delta u_i/\Delta T$ and $\Delta z_i/\Delta T$ and which multiply these velocities by the reciprocal value of loop gain $k_v$. The products formed by computing stages 7, 8 and 9 represent lag correction quantities and are transmitted to adders 14, 75 and 76 where the products are algebraically combined with the actual position values $y_i$, $u_i$ and $z_i$. The outputs of adders 14, 75 and 76 are connected via dividers 10, 11 and 12 to respective inputs of adder 15 which adds the sums from adders 14, 75 and 76 to form a corrected control variable $c_s'$ which serves to anticipate lag errors and conform the motion of workpiece 2 about the c axis exactly to the motions of tool 1.

Figure 2:
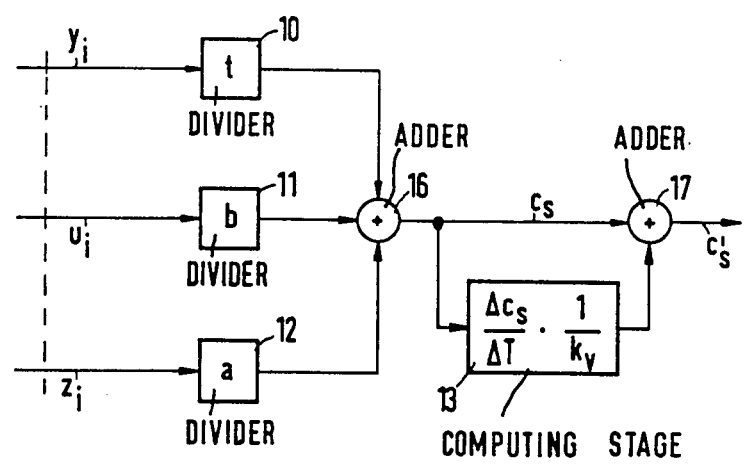
FIG. 2 is a block diagram showing a modification of a portion of the numerical control device illustrated in FIG. 1.

A simplification of the circuit for calculating the correction and, concomitantly, a simplification of the correction, are obtainable in accordance with a modified embodiment of the present invention shown in FIG. 2. Instead of a plurality of computing units 7, 8 and 9 and a plurality of associated adders 14, 75 and 76 (see FIG. 1), a single computing stage 13 is connected to the output of an adder 16 in turn coupled to the outputs of dividers 10, 11 and 12. Computing stage 13 calculates a rate of change of control variable $c_s$ and multiplies this rate of change by the reciprocal of loop gain $k_v$. The resulting product is fed to an adder 17 and summed therein with the instantaneous value of the control variable $c_s$. The sum formed by adder 17 is the corrected or lag-compensated control variable for the position control loop of workpiece 2.

Although the invention has been described in terms of particular embodiments and applications, one of ordinary skill in the art, in light of this teaching, can generate additional embodiments and modifications without departing from the spirit of or exceeding the scope of the claimed invention. For example, the two embodiments of the present invention described herein include circuit blocks; however, one of ordinary skill in the art will be able to carry out the invention by properly using the control functions of a computer, e.g., computer 18. Accordingly, it is to be understood that the descriptions and illustrations herein are proferred to facilitate comprehension of the invention and should not be construed to limit the scope thereof.

What is claimed is:

1. In a numerical control of a machining apparatus for manufacturing a gear from a workpiece, said numerical control including position control means for controlling a rotation of said workpiece in accordance with a motion of a tool, said numerical control including means for generating an electrically encoded control variable fed to said position control means to determine the operation thereof, the improvement wherein the numerical control is provided with compensation means for reducing a lag in the response of said position control means and in the rotation of the workpiece with respect to changes in an actual rate of rotation of the tool, said compensation means including computing means for calculating a correction quantity representative of said lag, said compensation means further including means for combining said correction quantity with said control variable prior to the feeding thereof to said position control means so that said lag is reduced.

2. The improvement defined in claim 1 wherein said correction quantity is calculated from a rate of change of said control variable.

3. The improvement defined in claim 1 wherein said correction quantity is calculated from the actual rate of rotation of said tool and a loop gain of said position control means.

4. The improvement defined in claim 3 wherein said numerical control is provided with additional compensation means for reducing an additional lag in the response of said position control means and in the rotation of the workpiece with respect to changes in an actual rate of translation of said tool, said additional compensation means including additional computing means for calculating from the actual rate of translation of said tool and a loop gain of said position control means an additional correction quantity representative of said additional lag.

5. The improvement defined in claim 4 wherein said means for combining is operatively connected to said additional compensation means for combining said additional correction quantity with said control variable prior to the feeding thereof to said position control means so that said additional lag is reduced.

6. A machining apparatus for the manufacture of a gear from a workpiece, comprising:
   a rotatable machine tool for cutting gear teeth into the workpiece;
   first rotary drive means operatively connected to said machine tool for rotating said machine tool about a first axis of rotation;
   first sensor means for detecting an actual angular position of said tool;
   input control means for generating an electrical signal representing a desired angular position of said tool;
   first feedback loop servo means operatively connected to said first sensor means, to said first rotary drive means and to said input control means for changing the rate of rotation of said tool so that said actual angular position corresponds to said desired angular position;
   second rotary drive means operatively couplable to said workpiece for rotating said workpiece about a second axis of rotation;
   second sensor means for detecting the actual angular position of said workpiece;
   second feedback loop servo means operatively connected to said second sensor means, to said second rotary drive means and to said first sensor means for changing the rate of rotation of said workpiece in response to changes in the rate of rotation of said tool; and
   numerical control means operatively connected to said first sensor means and to said second feedback loop servo means for reducing a lag in the response of said second feedback loop servo means and said second rotary drive means with respect to changes in the rate of rotation of said tool, said numerical control means including computing means for calculating from the actual rate of rotation of said tool and a loop gain of said second feedback loop servo means a correction quantity representative of said lag, said numerical control means further including means for transmitting said correction quantity to said second feedback loop servo means.

7. The machining apparatus defined in claim 6, further comprising:
   shifting means operatively connected to one of said workpiece and said tool for translating said one of said workpiece and said tool along a path;
   third sensor means for detecting an actual linear position of said one of said workpiece and said tool along said path; and
   third feedback loop servo means operatively connected to said third sensor means, to said shifting means and to said input control means for changing the rate of translation of said one of said workpiece and said tool so that the actual linear position of said one of said workpiece and said tool along said path corresponds to a desired linear position coded in an electrical signal generated by said input control means,
   said numerical control means being operatively connected to said third sensor means for reducing an additional lag in the response of said second feedback loop servo means and said second rotary drive means with respect to changes in the rate of translation of said one of said workpiece and said tool, said computing means calculating from the rate of translation of said one of said workpiece and said tool and said loop gain of said second feedback loop servo means an additional correction quantity representative of said additional lag.

8. A method for the manufacture of a gear from a workpiece, comprising the steps of:
   rotating a machine tool about a first axis of rotation;
   rotating the workpiece about a second axis of rotation;
   bringing said machine tool into contact with said workpiece to cut gear teeth into the workpiece;
   detecting an actual angular position of said tool;
   generating an electrical signal representing a desired angular position of said tool;
   changing a rate of rotation of said tool so that said actual angular position corresponds to said desired angular position;
   altering by means of a feedback loop servo control a rate of rotation of said workpiece in response to changes in the rate of rotation of said tool;
   calculating a correction quantity representative of a lag in the response of said feedback loop servo control and in the rotation of said workpiece with respect to changes in the rate of rotation of said tool; and feeding said correction quantity to said feedback loop servo control to reduce said lag.

9. The method defined in claim 8 wherein said correction quantity is calculated from the rate of rotation of said tool and a loop gain of said feedback loop servo control.

10. The method defined in claim 9, further comprising the steps of:

translating one of said workpiece and said tool along a path;

detecting the actual linear position of said one of said workpiece and said tool along said path; and generating an electrical signal encoding a desired linear position of said one of said workpiece and said tool;

changing the rate of translation of said one of said workpiece and said tool so that said actual linear position corresponds to said desired linear position;

calculating from the rate of translation of said one of said workpiece and said tool and said loop gain of said feedback loop servo control an additional correction quantity representative of an additional lag in the response of said feedback loop servo control and the rotation of said workpiece with respect to changes in the rate of translation of said one of said workpiece and said tool; and feeding said additional correction quantity to said feedback loop servo control to reduce said additional lag.

* * * * *